(12) United States Patent
Stillwell et al.

(10) Patent No.: US 9,896,145 B2
(45) Date of Patent: Feb. 20, 2018

(54) SYSTEM AND APPARATUS FOR A LINKAGE GUARD

(71) Applicants: Alan Stillwell, Scottsdale, AZ (US); Lynn Hodges, Nampa, ID (US)

(72) Inventors: Alan Stillwell, Scottsdale, AZ (US); Lynn Hodges, Nampa, ID (US)

( * ) Notice: Subject to any disclaimer, the term of this patent is extended or adjusted under 35 U.S.C. 154(b) by 84 days.

(21) Appl. No.: 15/080,951

(22) Filed: Mar. 25, 2016

(65) Prior Publication Data

US 2016/0207582 A1    Jul. 21, 2016

Related U.S. Application Data

(63) Continuation-in-part of application No. 14/030,882, filed on Sep. 18, 2013, now Pat. No. 9,376,161.

(51) Int. Cl.
*B62J 23/00*    (2006.01)
*B62K 25/04*    (2006.01)

(52) U.S. Cl.
CPC ............. *B62J 23/00* (2013.01); *B62K 25/04* (2013.01)

(58) Field of Classification Search
CPC .................. B62J 23/00; B62K 25/04
USPC ............ 280/304.3, 848, 850; 296/199, 204; 474/111, 140, 144
See application file for complete search history.

(56) References Cited

U.S. PATENT DOCUMENTS

| 4,471,851 A | 9/1984 | Kamiya et al. |
| 4,693,700 A | 9/1987 | Chappell |
| D532,720 S | 11/2006 | McGarry |
| 2005/0159260 A1 | 7/2005 | Gogo |
| 2005/0221936 A1 | 10/2005 | Seki et al. |
| 2007/0032324 A1 | 2/2007 | Uchiyama et al. |
| 2008/0054597 A1 | 3/2008 | Becker |
| 2010/0187036 A1 | 7/2010 | Locati et al. |
| 2012/0248730 A1 | 10/2012 | Sloan et al. |

*Primary Examiner* — Jacob D Knutson
(74) *Attorney, Agent, or Firm* — The Noblitt Group, PLLC

(57) ABSTRACT

System and apparatus for a linkage protector comprising a linkage arm and a shield element. The linkage arm comprises a front mounting portion rotatably coupled to the frame mount and a pair of arms depending from opposite ends of the front mounting portion. Each arm comprises a rear mounting portion coupled to a linkage mount at an end opposite the front mounting portion. The shield element depends from a lower portion of the front mounting portion at a distance from the arm and is configured to protect a lower rear suspension linkage. A cover may be coupled to the shield element.

20 Claims, 13 Drawing Sheets

SYSTEM AND APPARATUS FOR A LINKAGE GUARD

CROSS-REFERENCES TO RELATED APPLICATION

This application is a continuation-in-part of prior U.S. patent application Ser. No. 14/030,882, filed Sep. 18, 2013, and incorporates the disclosure of such application by reference.

BACKGROUND OF INVENTION

Off-road motorcycle riding and racing can be done on a variety of different terrain and in a variety of different conditions. In off-road riding and racing, the terrain may include natural terrain including environmental elements, such as, jagged rocks, boulders, logs, water crossings, mud, snow, and the like. The terrain may also be man-made environmental elements, such as, tires, rock gardens, or any other wood, rock, rubber, etc. combination for an obstacle that is contemplated by the builder or designer of the race course.

Some off-road riding and races are conducted over extreme terrain, which subjects the motorcycle to extreme conditions. In these conditions, some areas of the motorcycle are subject to the elements of the terrain and require extra protection. For example, off-road motorcycles, which operate under these extreme conditions often have additional protection components to protect the parts and/or portions of the motorcycle that come into contact with the environmental elements. Some examples include disc brake guards, chain guide protectors, skid plates, pipe guards, and the like. Some of these motorcycles also contain rear suspension that has a rear shock lower linkage that may be exposed to the environmental elements. In some cases the exposed rear shock lower linkage can be damaged by the elements either rendering the motorcycle inoperable or damaging the linkage so that the linkage must be repaired or replaced.

SUMMARY OF THE INVENTION

System and apparatus for a linkage protector for a motorcycle having a rear shock with an exposed lower rear suspension linkage, a frame mount, and a joint having a linkage mount and a rear shock mount. The rear shock mount is coupled to the exposed lower linkage. The linkage protector comprises a linkage arm and a shield element. The linkage arm comprises a front mounting portion rotatably coupled to the frame mount and a pair of arms depending from opposite ends of the front mounting portion. Each arm comprises a rear mounting portion coupled to the linkage mount at an end opposite the front mounting portion. The shield element depends from a lower portion of the front mounting portion at a distance from the arm and is configured to protect the exposed lower rear suspension linkage. A cover may be coupled to the shield element to protect the exposed shield element.

BRIEF DESCRIPTION OF THE DRAWINGS

A more complete understanding of the present invention may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present invention may be described in terms of functional block components and various processing steps. Such functional blocks may be realized by any number of components configured to perform the specified functions and achieve the various results. For example, the present invention may employ various types of materials, fastening devices, surface finishes and the like, which may carry out a variety of functions. In addition, the present invention may be practiced in conjunction with any number of ways to protect a motorcycle suspension linkage, and the system described is merely one exemplary application for the invention. Further, the present invention may employ any number of conventional techniques for metalworking, component manufacturing, tooling, fabrication, and/or forming surfaces.

The system and apparatus for a linkage protector according to various aspects of the present invention may operate in conjunction with any suitable motorcycle having an exposed lower rear shock linkage. Various representative implementations of the present invention may also be applied to any device having an exposed lower rear shock linkage.

Figure 1:
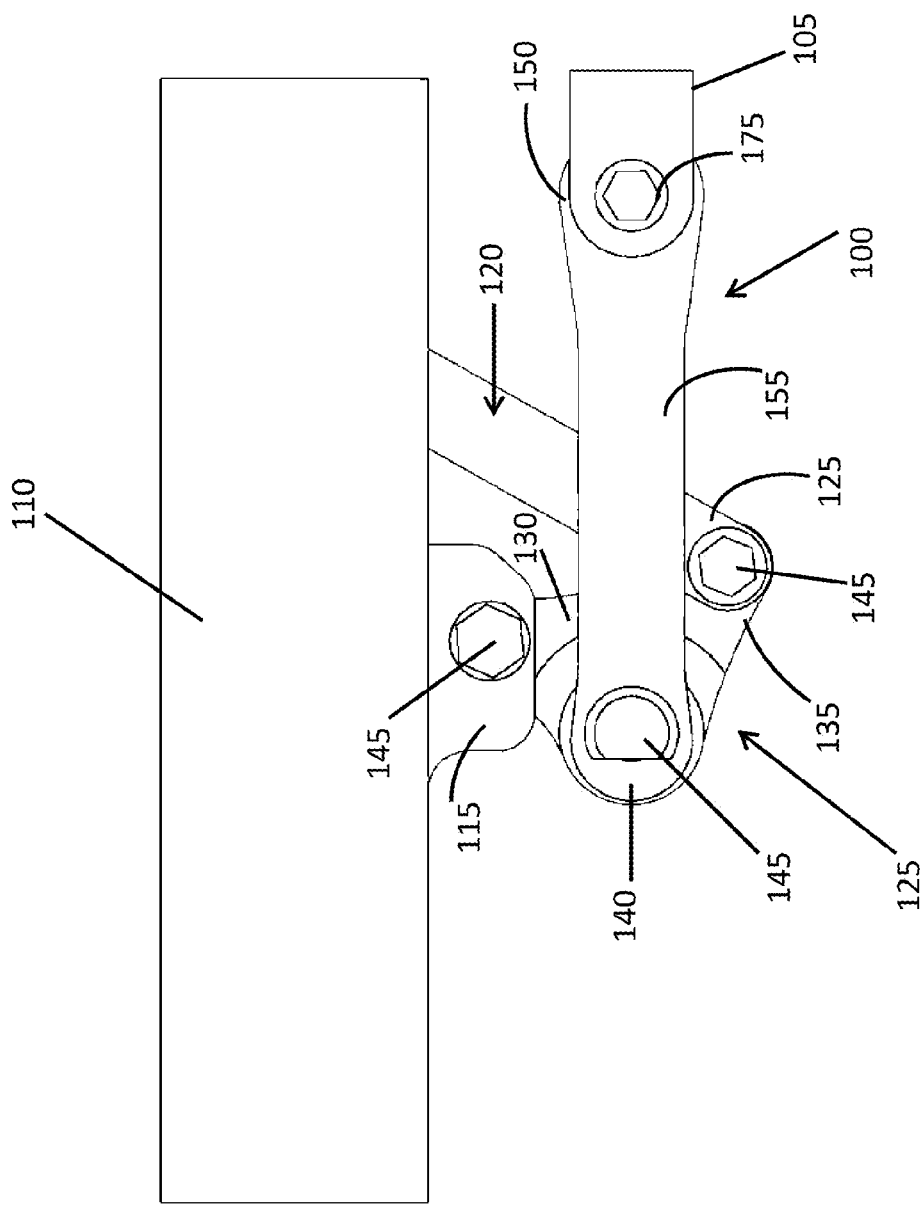
FIG. 1 representatively illustrates a side view of a standard linkage arm installed on a motorcycle.
Figure 2:
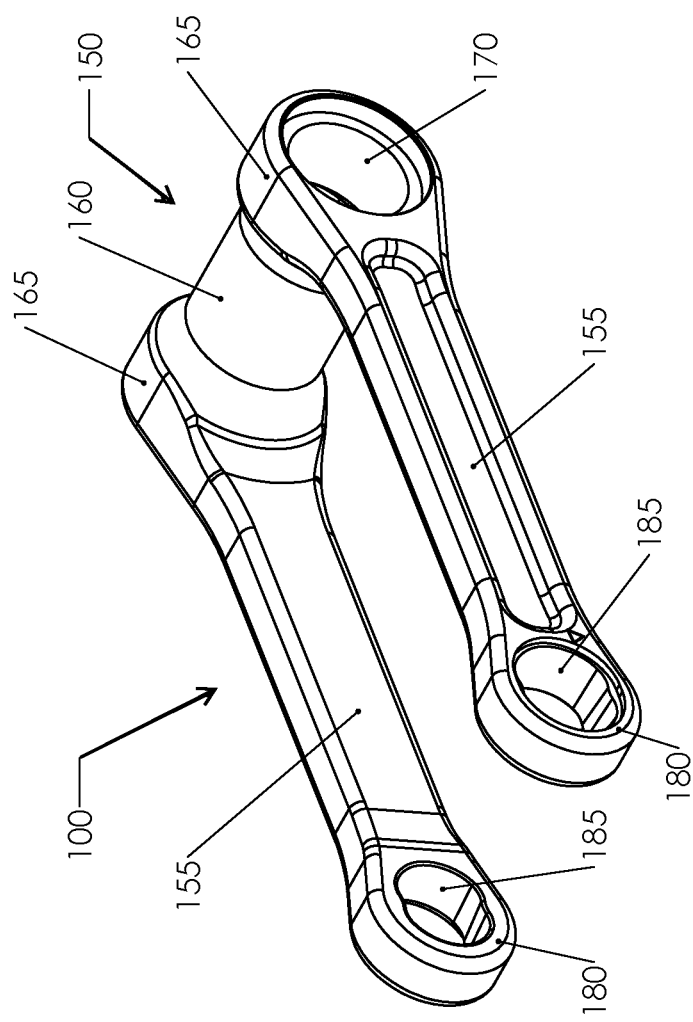
FIG. 2 representatively illustrates a perspective view of the standard linkage arm.

Referring now to FIGS. 1 and 2, a standard linkage arm 100 is shown attached to a motorcycle comprising a frame 105, a swing arm 110, a swing arm mount 115, an exposed rear shock linkage 120, and a joint 125. The joint 125 may comprise swing arm mount 130 for coupling the joint 125 to the swing arm 110, a rear shock mount 135 for coupling the rear shock linkage 120 to the joint 125, and a linkage mount 140. Each of the swing arm mount 130, the rear shock mount 135, and the linkage mount 140 may comprise a receiving portion, which allows the various understood components to be coupled to the joint 125 by any suitable fastener 145, such as, for example a nut and bolt configuration.

The standard linkage arm 100 comprises a front mounting portion 150 and a pair of side arms 155. The front mounting portion 150 may comprise a central portion 160 and a pair of ends 165. The front mounting portion 150 is coupled to a rear portion of the motorcycle frame 105. The front mounting portion 150 comprises an inner bore 170 that receives a fastener 175, such as a nut and bolt, to couple the linkage arm 100 to the frame 105. Each of the side arms 155 may be oriented generally parallel to one another and depend rearwardly from the ends 165 of the front mounting portion 155. The side arms 155 may comprise a mounting portion 180 located opposite of the front mounting portion 150. The mounting portions 180 may comprise an opening 185 which receives a fastener 145 to couple the linkage mount 140 to the joint 125, as discussed above.

It can be seen from the embodiment show in FIG. 1, that the rear shock linkage 120 and joint 125 are exposed to contact from foreign objects when the motorcycle is in use.

Figure 3:
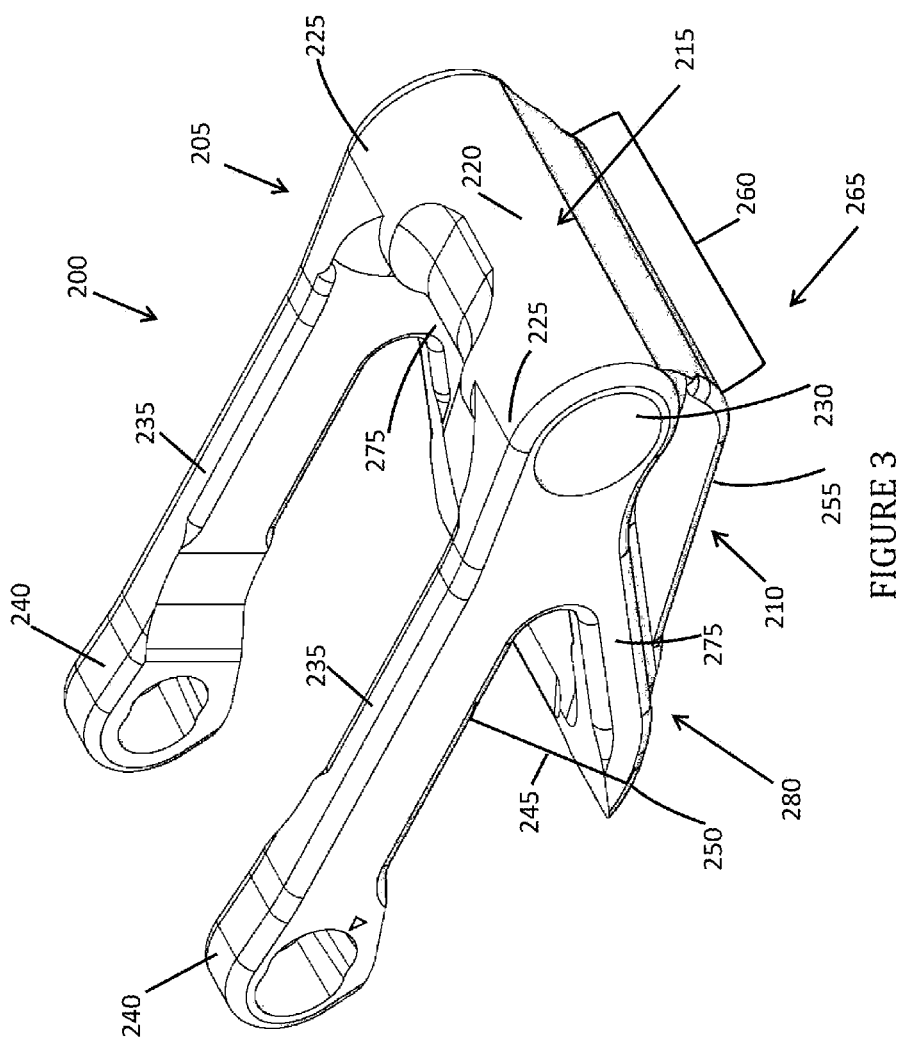
FIG. 3 representatively illustrates a perspective view of a linkage protector in accordance with an exemplary embodiment of the present invention.
Figure 4:
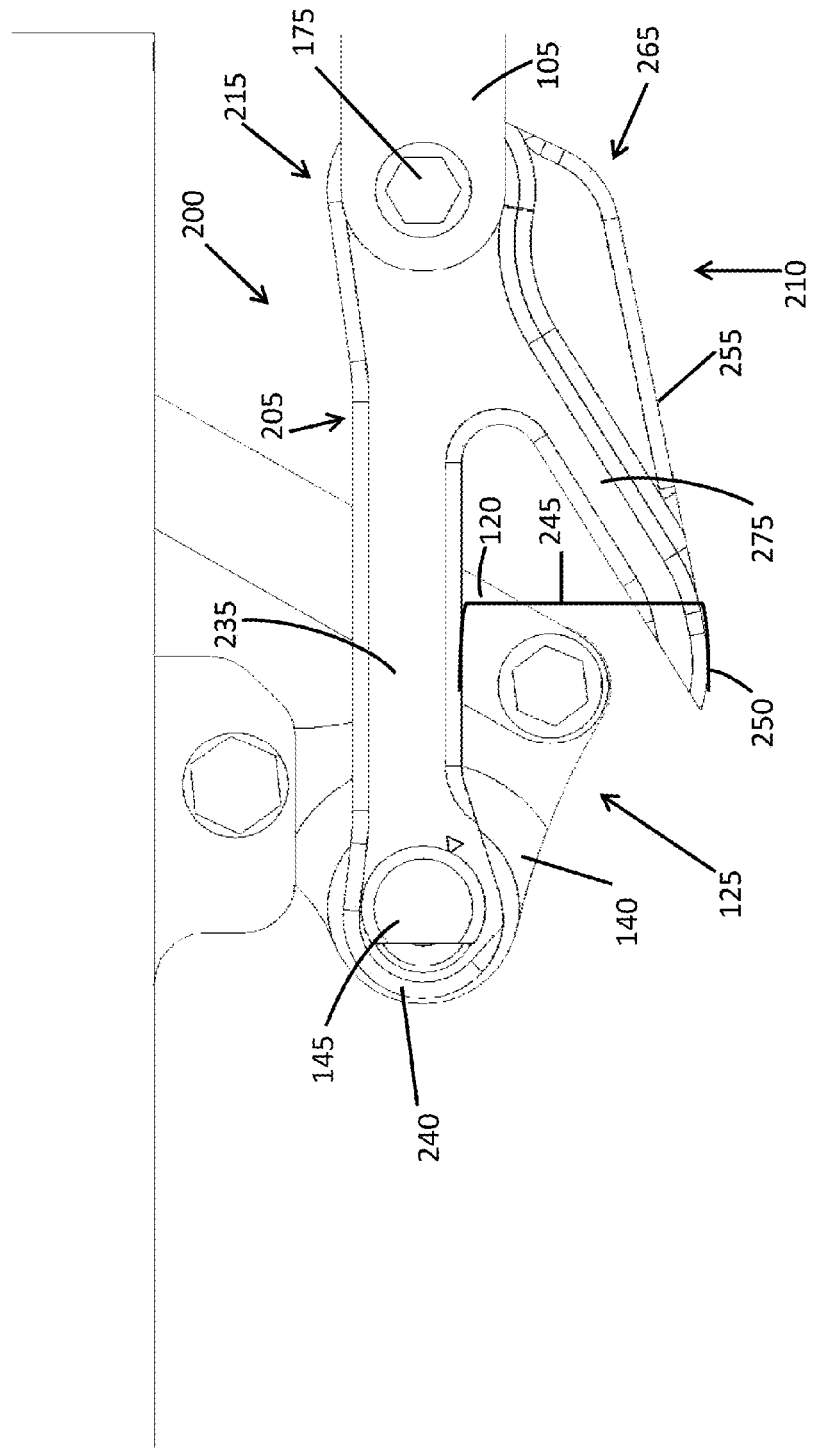
FIG. 4 representatively illustrates a side view of the linkage protector installed on a motorcycle in accordance with an exemplary embodiment of the present invention.

Referring now to FIGS. 3 and 4, in an exemplary embodiment of the present claims, a linkage protector 200 may comprise a linkage arm 205 and a shield element 210. The linkage arm 205 may comprise a front mounting element 215 having a central element 220 and a pair of ends 225. The linkage arm 205 may be coupled to a rearward portion of the motorcycle frame 105. As shown in FIG. 4, the linkage protector 200 may be coupled to the frame 105 by any suitable fastener 175, such as, for example, and nut and bolt connection which is received in a bore 230 in the front mounting element 215 of the linkage arm 205. The linkage protector 200 may comprise a pair of side arms 235 oriented generally parallel to one another. The side arms 235 depend rearwardly from the ends 225 of the front mounting element 215 of the linkage arm 205. The side arms 235 may comprise a mounting portion 240 located opposite the front mounting element 215 of the linkage arm 205. The mounting portions 240 may be coupled to the linkage mount 140 of the joint 125 by a fastener 145, in the same manner as discussed above. The mounting portions 240 may comprise a static mounting portion or an adjustable mounting portion as will be discussed in detail below.

In various embodiments, the shield element 210 depends rearwardly and downwardly at an angle from the front mounting element 215 of the linkage arm 205. The shield element 210 may be oriented to provide a clearance distance 245 between a lower portion 250 of the shield element 210 and the linkage arm 205, such that the rear shock linkage 120 may not be contacted by any foreign object. The shield element 210 operates to provide a deflection surface 255 such that the rear shock linkage 120 may not be damaged by environmental elements. The shield element 210 may comprise a width 260 so as to fully protect the rear shock linkage 120 from an impact from an object. The shield element 210 may be configured to protect the exposed rear shock linkage 120 from an impact from an object from a forward or underneath position, shown as numeral 265. The width 260 of the deflection surface 255 and the clearance distance 245 may be configured to provide protection from an impact from an object from a forward position as shown by numeral 265.

In some embodiments, the linkage protector 200 may comprise a sidewall 275 to connect a portion of the linkage arm 205 and the shield element 210. The sidewall 275 may be integral with the linkage arm 205 and shield element 210. The sidewall 275 may be a partial or full sidewall. The sidewall 275 may be configured to provide additional support between the linkage arm 205 and the shield element 210. As shown in FIGS. 3 and 4, sidewall 275 may comprise a partial sidewall which connects a portion of the linkage arm 205 to a portion of the shield element 210 proximate the front mounting element 215. The partial sidewall 275 may be configured to support the shield element 210 when a foreign object strikes the shield element 210 during use. The sidewall 275 may operate to protect the rear shock linkage 120 from a side impact, as shown by reference numeral 280. Other configurations of the sidewall 275 are contemplated and will be discussed in greater detail below.

Figure 5:
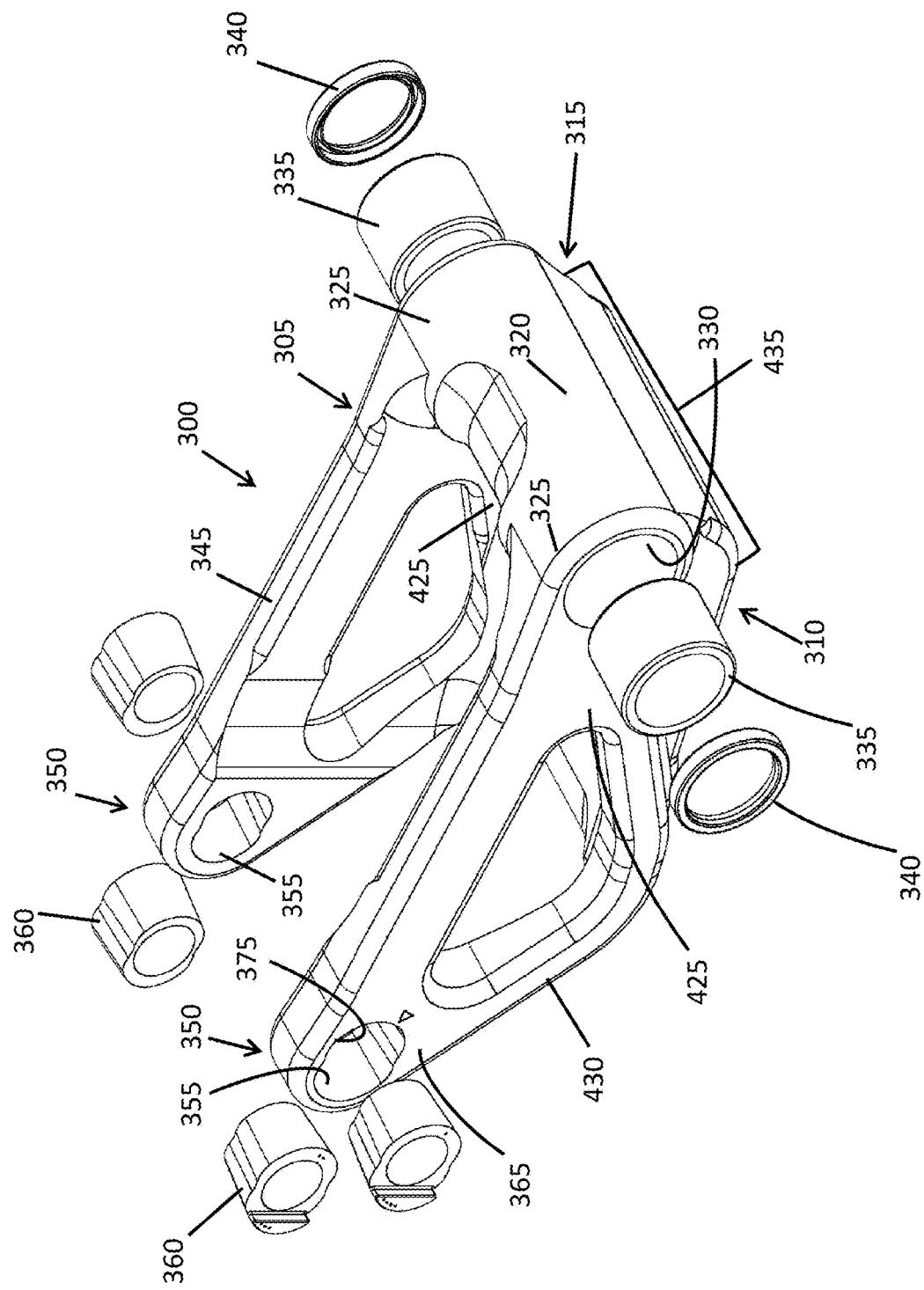
FIG. 5 representatively illustrates a perspective view of a linkage protector in accordance with an exemplary embodiment of the present invention.
Figure 6:
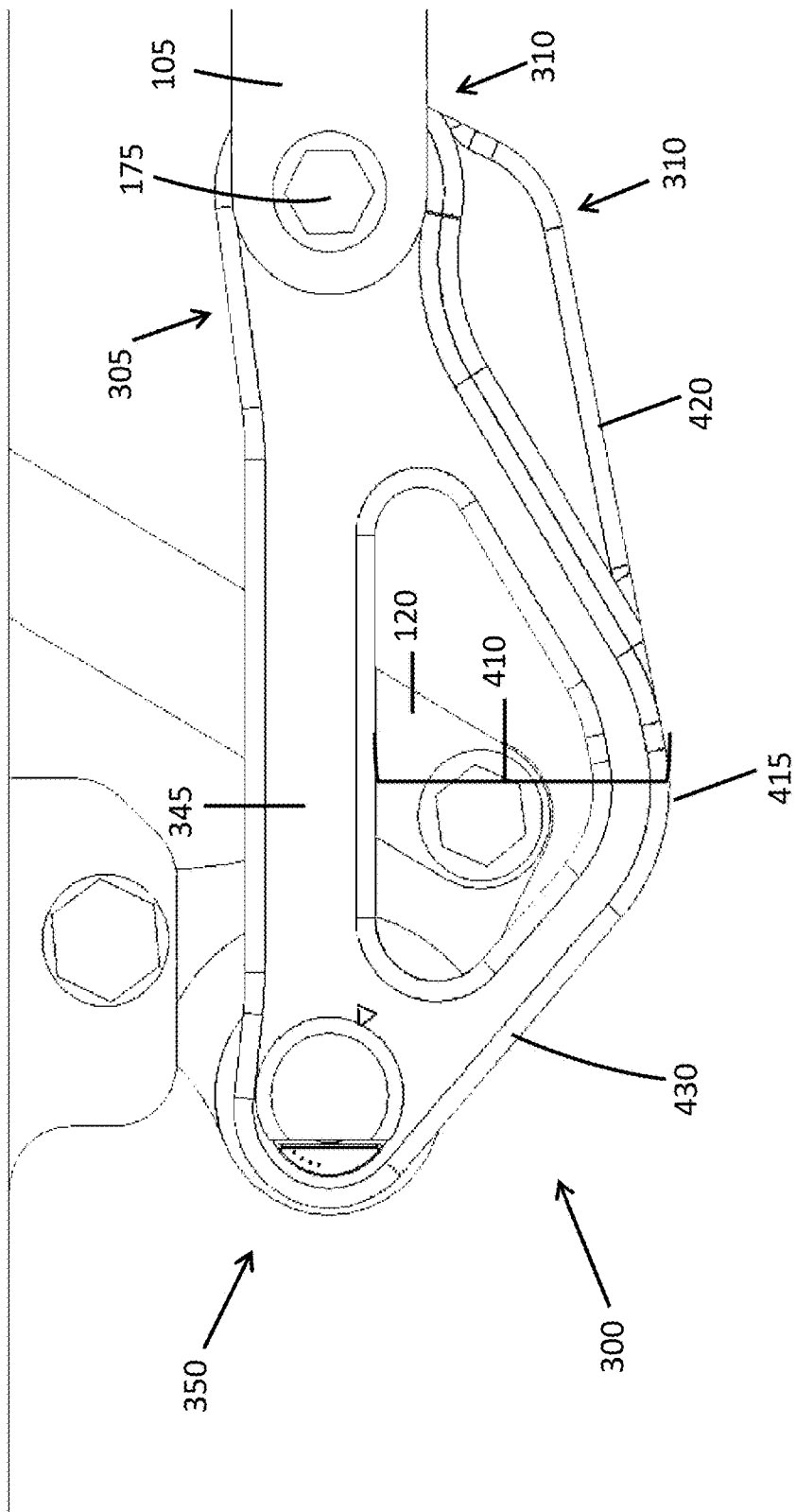
FIG. 6 representatively illustrates a side view of the linkage protector installed on a motorcycle in accordance with an exemplary embodiment of the present invention.
Figure 7:
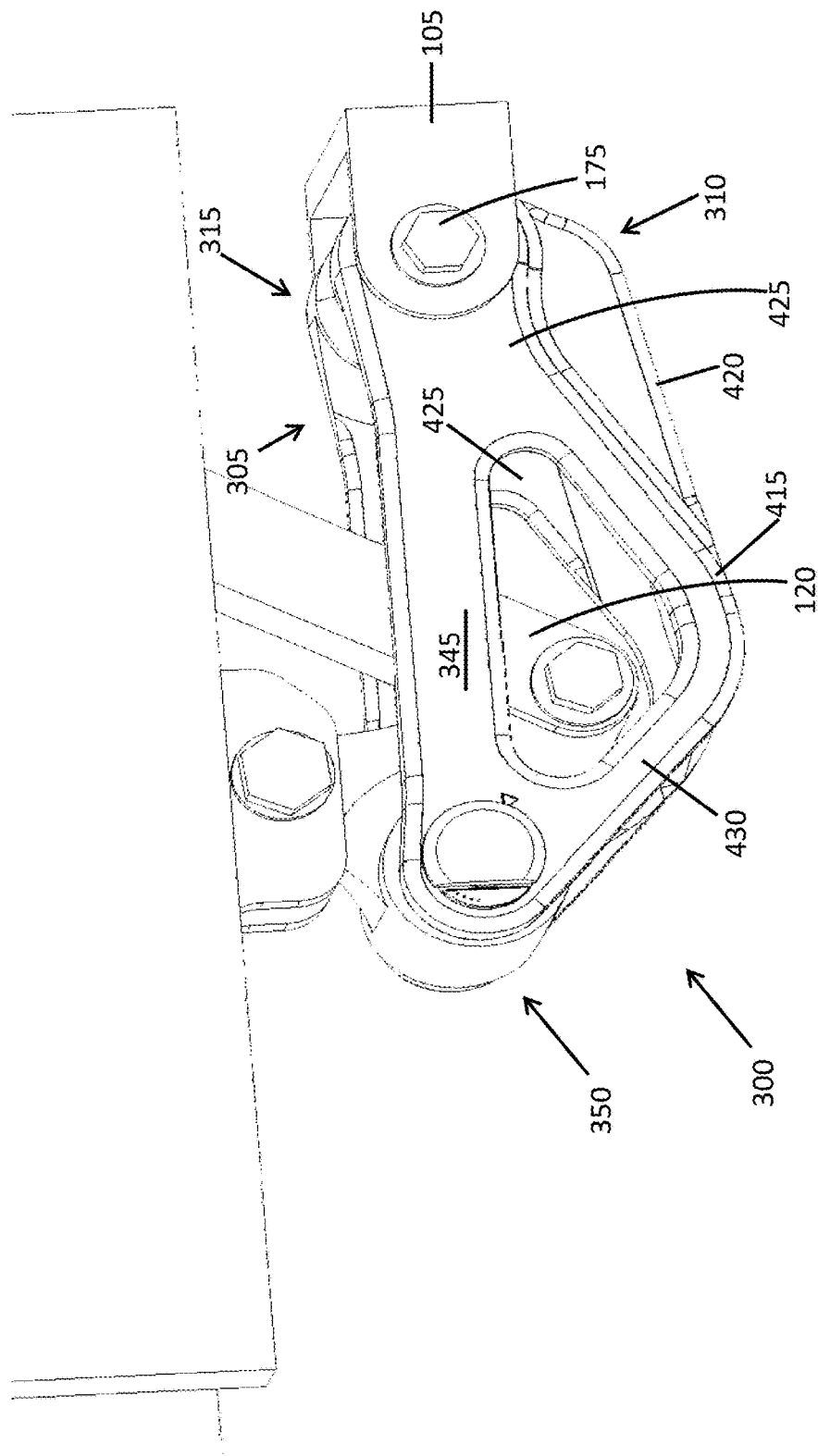
FIG. 7 representatively illustrates a side perspective view of the linkage protector installed on a motorcycle in accordance with an exemplary embodiment of the present invention.

Referring now to FIGS. 5-7, an additional exemplary embodiment of a linkage protector 300 will be discussed. The linkage protector 300 may comprise a linkage arm 305 and a shield element 310. The linkage arm 305 may comprise a front mounting element 315 having a central element 320 and a pair of ends 325. The linkage arm 305 may be coupled to a rearward portion of the motorcycle frame 105. As shown in FIGS. 6 and 7, the linkage protector 300 may be coupled to the frame 105 by any suitable fastener 175, such as, for example, and nut and bolt connection which is received in a bore 330 in the front mounting element 315 of the linkage arm 305. As shown in FIG. 5, a pair of collars and/or bearings 335 and seals 340 may be utilized with the nut and bolt connection to facilitate attachment of the linkage protector 300 to the frame 105. A similar configuration may be utilized in all embodiments discussed herein and shown in the figures.

In various embodiments, the linkage arm 305 may comprise a pair of side arms 345 oriented generally parallel to one another. The side arms 345 depend rearwardly from the ends 325 of the front mounting element 315 of the linkage arm 305. The side arms 345 may comprise a mounting portion 350 located opposite the front mounting element 315 of the linkage arm 305.

Figure 10:
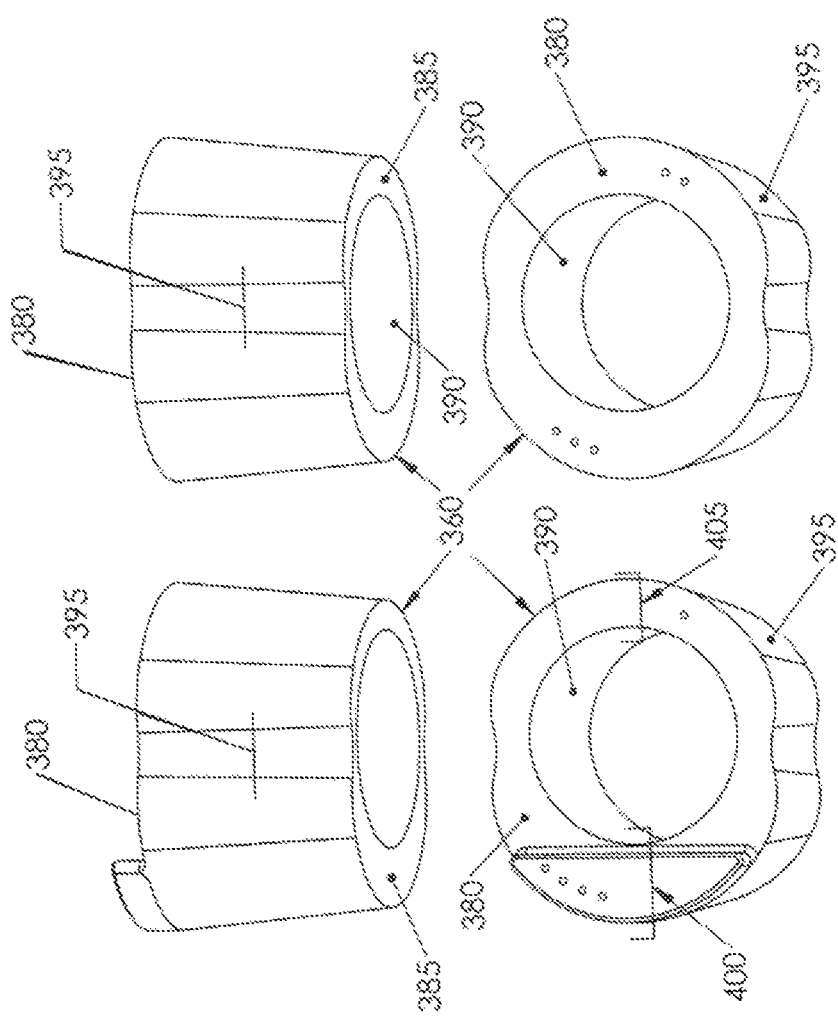
FIG. 10 representatively illustrates a top and a side perspective view of rear view of an adjusting cam in accordance with an exemplary embodiment of the present invention.

Referring now to FIGS. 5 and 10, in some embodiments, the mounting portions 350 may comprise an adjustable mounting portion. The adjustable mounting portion 350 may comprise an opening 355 that receives an adjusting cam 360. The adjustable mounting portion 350 may comprise a first surface 365 on the exterior surface of the side arm 345 and a second surface 370 on the interior surface of the side arm 345. The opening 360 may comprise a sidewall 375 that tapers inwardly from the first surface 365 to the second surface 370.

In various embodiments, the adjusting cam 360 may comprise a first surface 380 and a second surface 385. When the adjusting cam 360 is inserted within the opening 355, the first surface 380 may be proximate the exterior surface of the side arm 345 and the second surface 385 may be proximate the interior surface of the side arm 345. The adjusting cam 360 may taper inwardly from the first surface 380 to the second surface 385 such that the adjusting cam 360 may be received within the opening 360.

In various embodiments, the adjusting cam 360 may comprise a cylindrical opening 390 and an outer wall surface 395. The cylindrical opening 390 and outer wall surface 395 further define a first wall thickness 400 and a second wall thickness 405. In a first position, where the first wall thickness 400 is greater than the second wall thickness 405, the distance between the linkage arm 305 connection point the motorcycle frame 105 and the mounting portion 350 on the side arms 345 is shorter causing the joint 125 to rotate counterclockwise about the swing arm mount 130 and to raise the rear shock linkage 120, thereby raising the rear shock (not shown). Raising the rear shock, in turn, raises the rear of the motorcycle (not shown) upwardly thereby increasing the sharpness of the steering of the motorcycle. In a second position, where the adjusting cam has been rotated 180 degrees, the distance between the linkage arm 305 connection point the motorcycle frame 105 and the mounting portion 350 on the side arms 345 is greater causing the joint 125 to rotate clockwise about the swing arm mount 130 and to lower the rear shock linkage 120. Lowering the rear shock, in turn, lowers the rear of the motorcycle, thereby decreasing the sharpness of the steering of the motorcycle. Accordingly, based on the thickness of the first wall 400 and second wall 405 and the orientation thereof, the rider may customize the height and steering of the motorcycle by removing and rotating the adjusting cam 360 within the cylindrical opening 390.

Referring again to FIGS. 5-7, the shield element 310 depends rearwardly and downwardly at an angle from the front mounting element 315 of the linkage arm 305. The shield element 310 may be oriented to provide a clearance distance 410 between a lower portion 415 of the shield element 310 and side arm 345, such that the rear shock linkage 120 may not be contacted by any foreign object, as discussed in detail above. The shield element 310 operates to provide a deflection surface 420 such that the rear shock linkage 120 may not be damaged by environmental elements.

As discussed above with regard to FIGS. 3 and 4, the shield element 310 may comprise a width 435 so as to fully protect the rear shock linkage 120 from an impact from an object. The shield element 310 may be configured to protect the rear shock linkage 120 from an impact from an object from a forward, underneath and/or side position. The width of the deflection surface 420 and the clearance distance 410 may be configured to provide protection from an impact from an object from a forward position, an underneath, and a side position.

The linkage protector 300 may comprise a partial sidewall 425 to connect a portion of the linkage arm 305 and the shield element 310. The partial sidewall 425 may be integral with the linkage arm 305 and shield element 310. The partial sidewall 425 connects a portion of the linkage arm 305 to a portion of the shield element 310 proximate the front mounting element 315. The partial sidewall 425 is configured to support the shield element 310 when a foreign object strikes the shield element 310 during use. The sidewall 425 may operate to further protect the rear shock linkage 120 from a side impact, as described above.

In some embodiments, the linkage protector 300 may comprise a rear support member 430. The rear support member 430 may extends from the lower portion 415 of the shield element 310 to a rear portion of the linkage arm 305. While the rear support member 430 is shown proximate the mounting portion 350, the rear support member may extend from the shield element 310 to any suitable position on the side arm 345. The rear support member 430 may be configured to support the shield element 310 when a foreign object strikes the shield element 310 during use.

Figure 9:
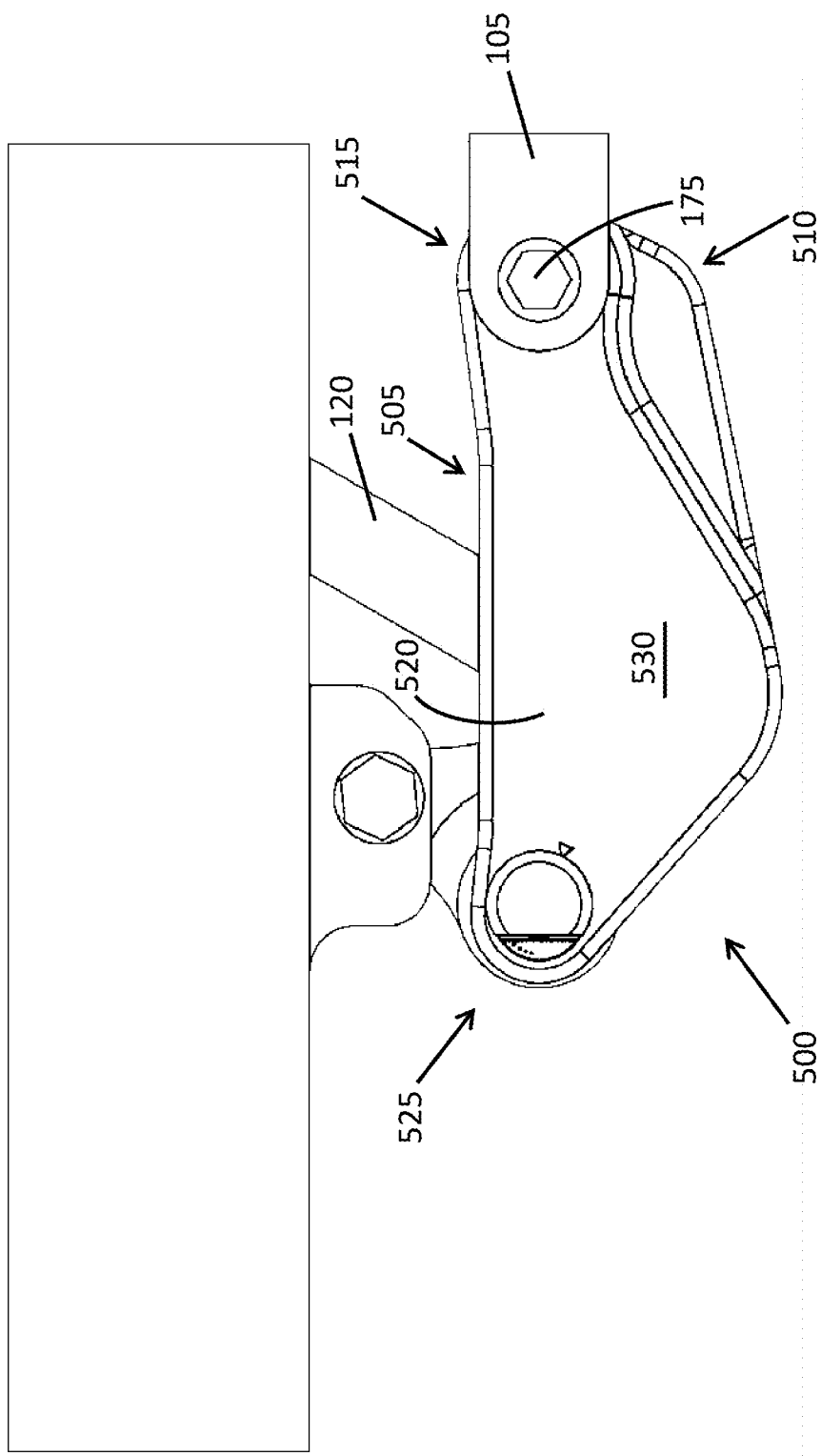
FIG. 9, representatively illustrates a side view of the linkage protector installed on a motorcycle in accordance with an exemplary embodiment of the present invention.

Referring now to FIG. 9, an additional embodiment of a linkage protector 500 will be discussed. The linkage protector 500 comprises many similar elements to those discussed above and shown in FIGS. 3-7 and is connected or installed on the motorcycle in the same manner. In one embodiment, the linkage protector 500 may comprise a full linkage arm 505 and a shield element 510. The full linkage arm 505 may comprise a front mounting element 515 having a central element and a pair of ends, similar to that discuss above. The full linkage arm 505 may be coupled to a rearward portion of the motorcycle frame 105 by any suitable fastener 175.

The full linkage arm 505 may comprise a pair of side arms 520 oriented generally parallel to one another. The side arms 520 depend rearwardly from the ends of the front mounting element 515 of the full linkage arm 505. The side arms 520 may comprise a mounting portion 525 located opposite the front mounting portion of the linkage arm. The mounting portion 525 may be similar to either embodiment discussed above.

The full linkage arm 505 may comprise a sidewall 530 that extends between the side arms 520 and the shield element 510. The sidewall 530 is configured to support the shield element 510 when a foreign object strikes the shield element 510 during use. The sidewall 530 may operate to protect the rear shock linkage 120 from a front and/or side impact, as described above.

Figure 11:
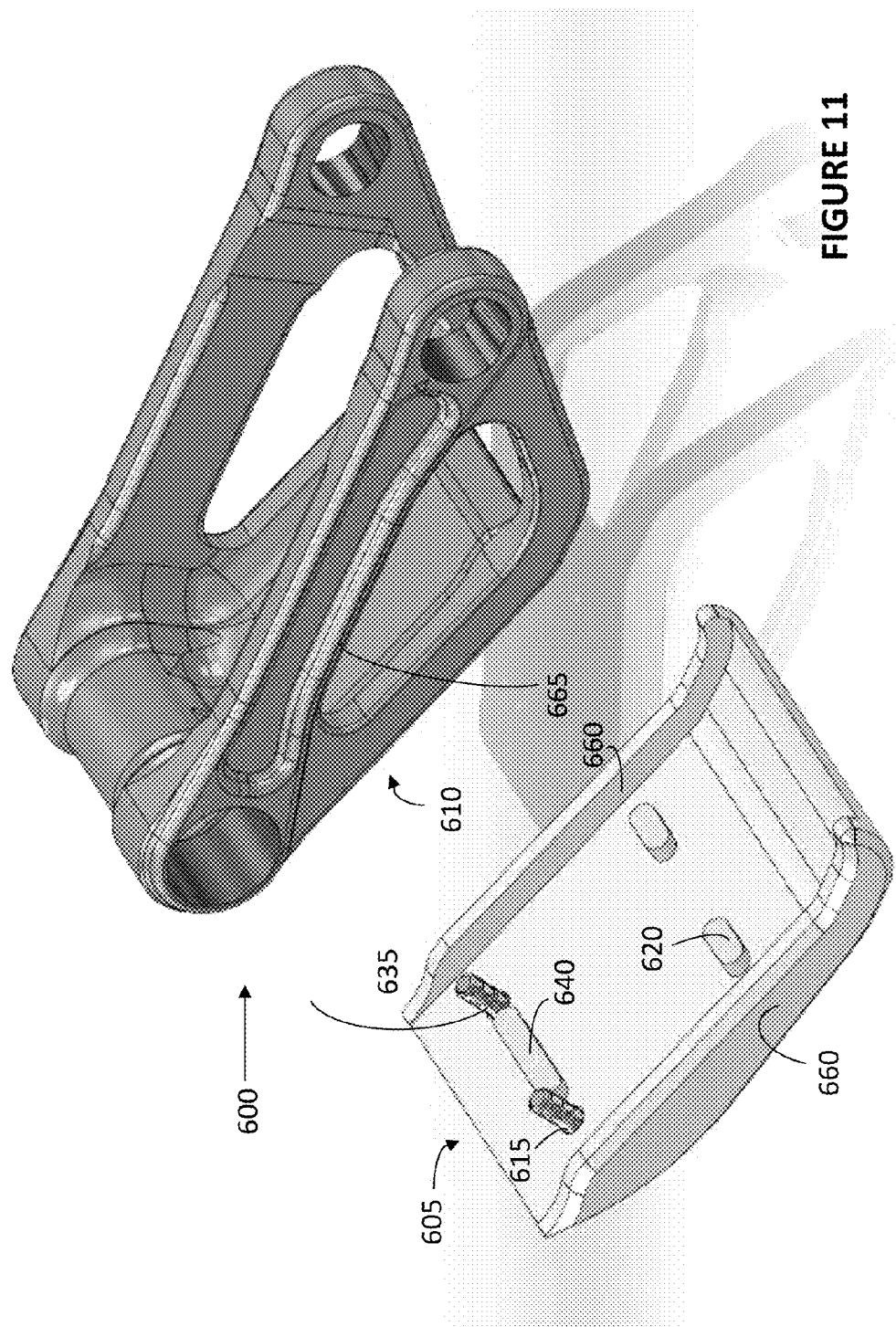
FIGS. 11 and 12 representatively illustrate an exploded perspective view of a linkage protector and a cover in accordance with an exemplary embodiment of the present invention.
Figure 12:
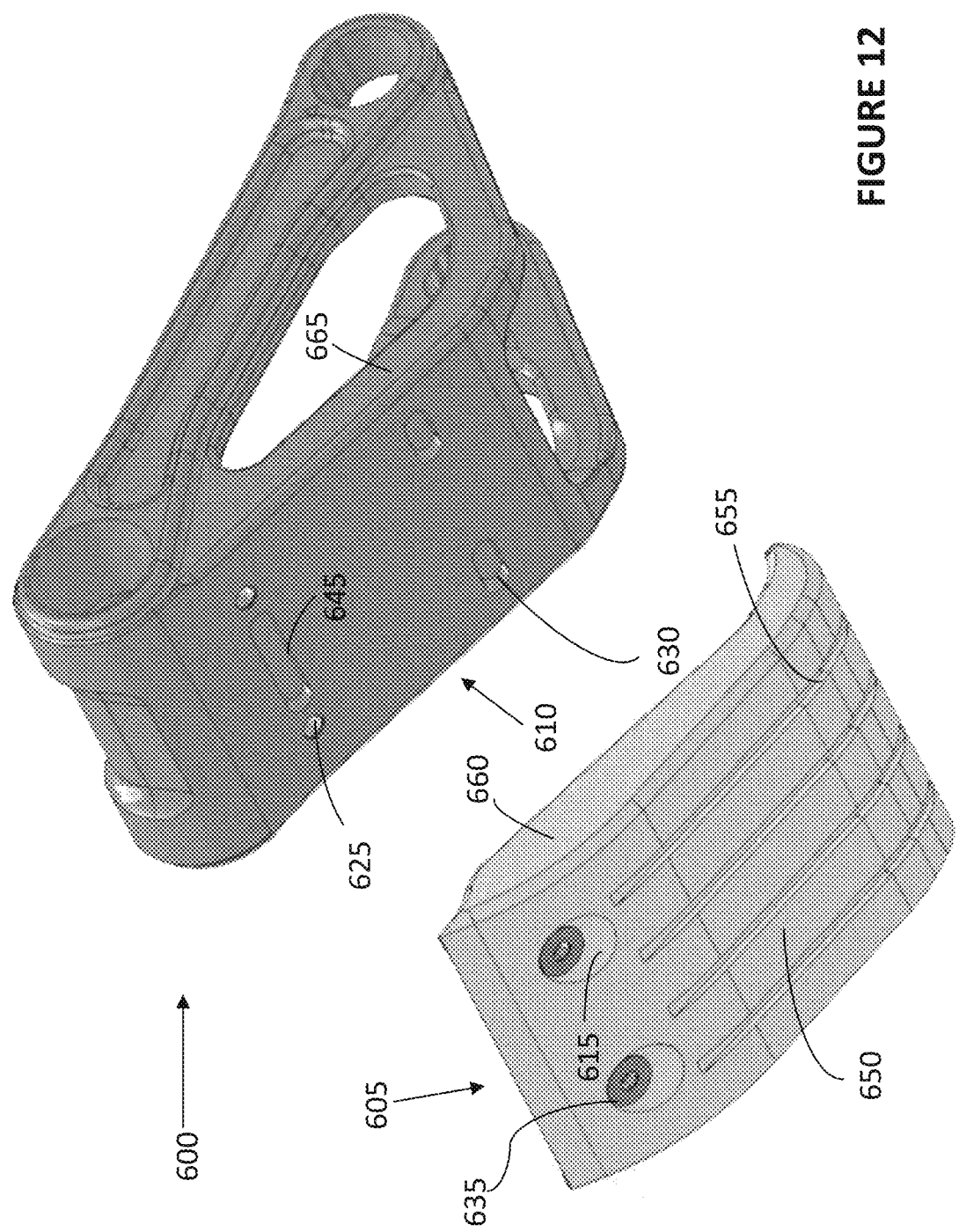
Figure 13:
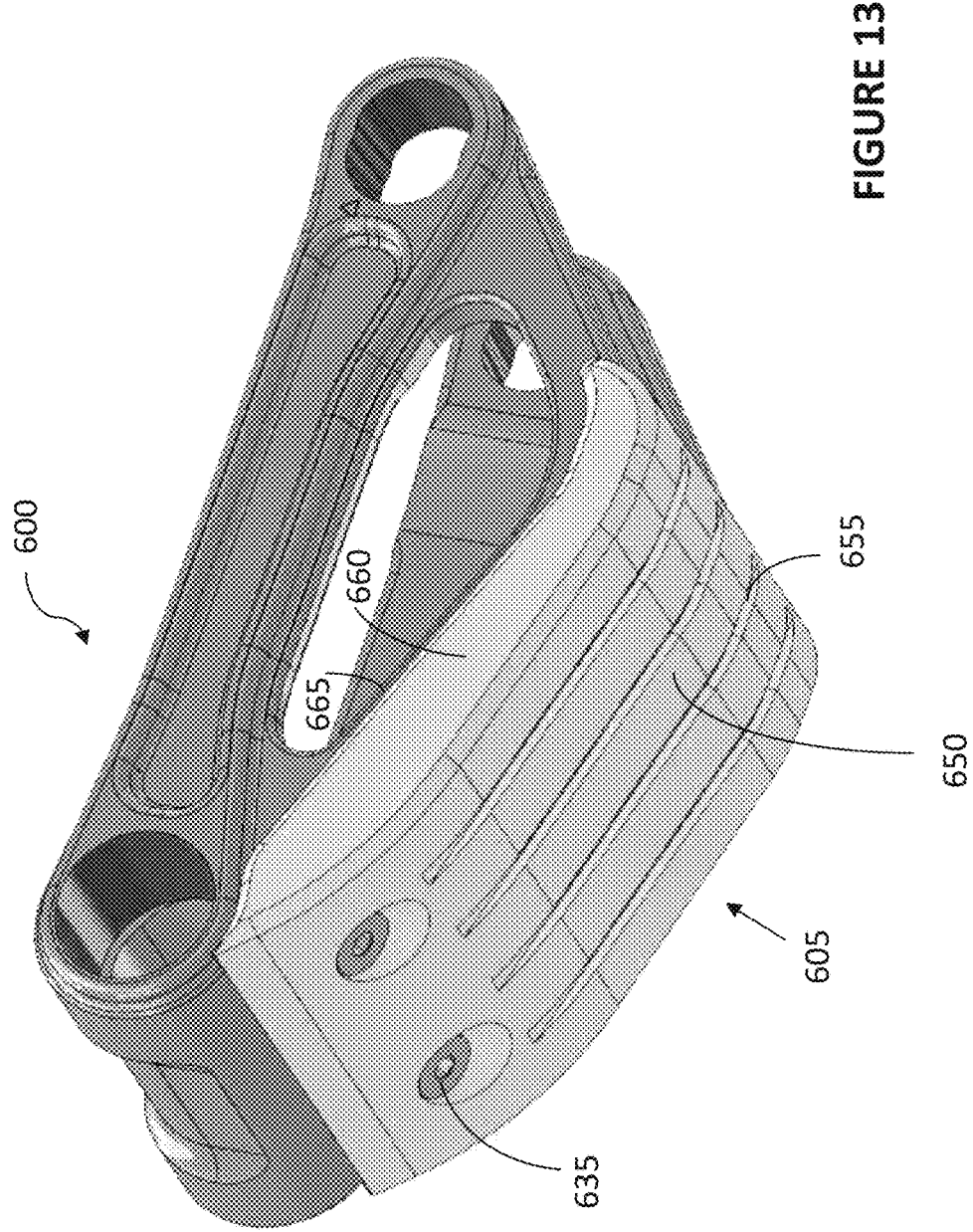
FIG. 13 representatively illustrates a perspective view of a linkage protector and with the cover installed in accordance with an exemplary embodiment of the present invention.

Referring now to FIGS. 11-13, the linkage protector 600 may further comprise a cover 605 configured to attach to the shield element 610. The cover 605 can attach to any of the linkage protectors discussed above to protect any shield element and/or deflection surfaces discussed above. The cover 605 may comprise any suitable material such as plastic, metal, composite material, carbon fiber, glass fiber, fiberglass, ultra-high-molecular-weight polyethylene (UHMW), glass filled UHMW, derlin (polyoxymethylene), glass filled delrin, polytetrafluoroethylene (PTFE) filled delrin, chemical and wear resistant acetal, chemical and wear resistant polyoxymethylene, wear resistant nylon, glass filled nylon, HYDE Plate, TM Design Plastics, fluorinated ethylene propylene (FEP), perfluoroalkoxy alkanes (PFA), abrasion-resistant UHMW, electrically conductive UHMW, high-temperature UHMW, very high molecular weight polyethylene (VHMW) and the like. For example, in one embodiment, the cover 605 may comprise plastic.

The cover 605 may be coupled to the linkage protector 600 in any suitable manner. The cover 605 may be coupled by any known fastener. The cover 605 may be snapped, glued, bolted, or otherwise coupled to the shield element 610 of the linkage protector 600. The cover 605 may be configured to conform to the shape and size of the shield element 610. The cover 605 may be coupled to the shield element 610 by bolts, screws, a nut and bolt connection, rivets, adhesive, zip ties, and the like.

The cover 605 may comprise a pair of apertures 615 and a pair of protrusions 620 which facilitate attachment of the cover 605 to the shield element 610 of the linkage protector 600. When the cover 605 is used with the linkage protector 600, the linkage protector 600 may comprise a pair of threaded apertures 625 and a pair of recesses 630. The pair of threaded fasteners 635 may be used to couple the cover 605 to the shield element 610. The protrusions 620 may be received within the recesses 630 and the fasteners 635 may be coupled to the threaded apertures 625. The cover 605 may further comprise a tab 640 that is received within an elongated recess 645 used to align the cover 605 when attaching to the linkage protector 600.

The cover 605 may be conformed to fit the profile of the shield element 610. The cover 605 may comprise a deflection surface 650 configured to contact any foreign object that strikes the shield element 610 during use. The deflection surface 650 may comprise one or more grooves 655 configured to provide smooth rollover when a foreign object contacts the cover 605. The cover 605 may comprise a pair of sidewalls 660 that protect sidewalls 665 of the linkage protector 600.

Figure 8:
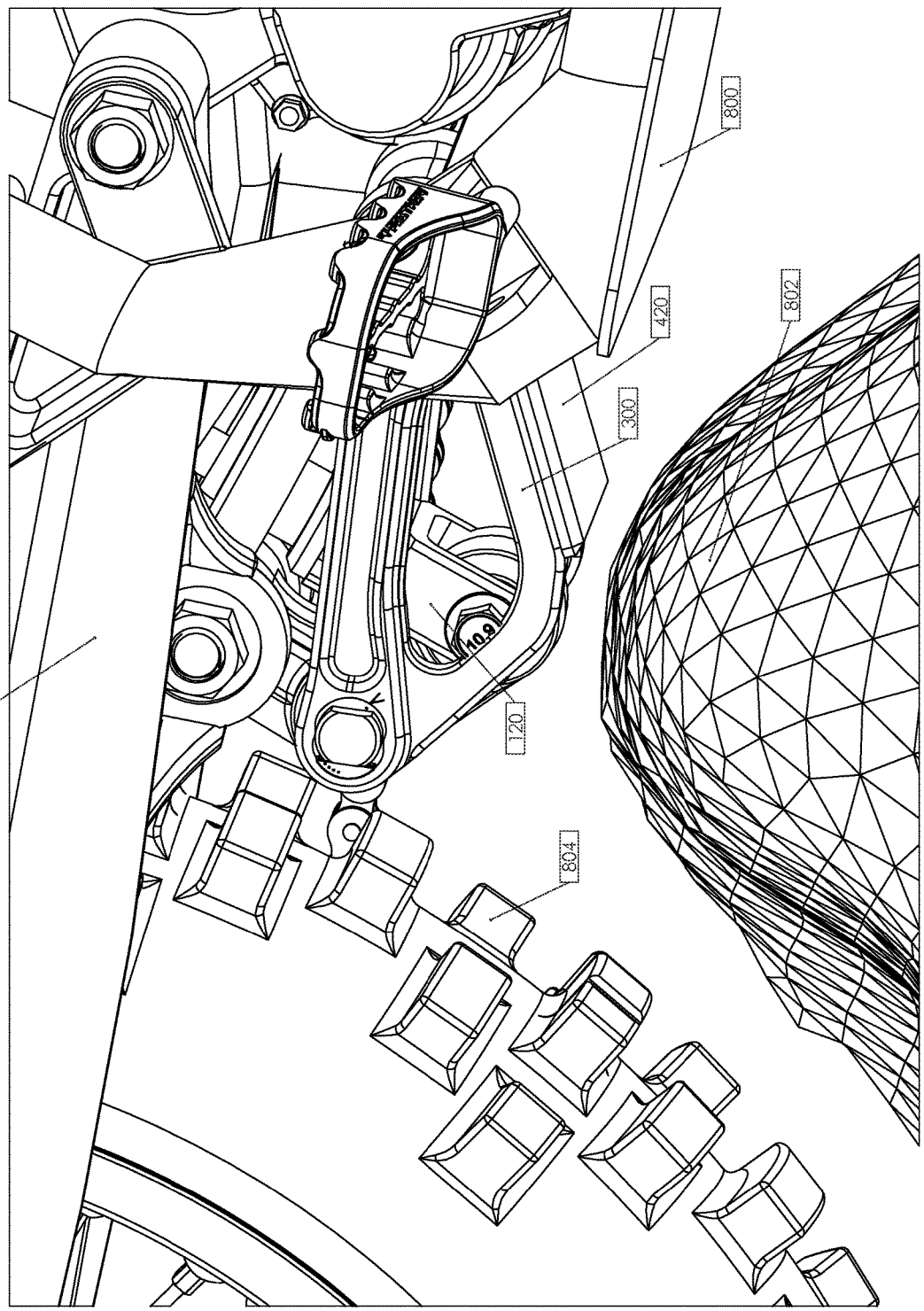
FIG. 8 representatively illustrates a side perspective view of the linkage protector installed on a motorcycle in an alternate position, in accordance with an exemplary embodiment of the present invention.

Referring now to FIG. 8, in operation the linkage protector 300, 600 described above in FIGS. 5-7 and 11-13 will be discussed. FIG. 8 shows a portion of a motorcycle with a skid plate 800 and the linkage protector 300, 600 installed to protect the rear shock linkage 120. As is understood, the motorcycle is moving in a forward direction and has contacted an obstacle, in this case a mound of dirt 802. The mound of dirt 802 initially contacts the skid plate 800 of the motorcycle. While continuing moving forward, the mound of dirt 802 then contacts the deflection surface 420, 650 of the shield element 310 and/or the cover 605 if installed. Contacting the deflection surface 420, 650 causes the swing arm 110 to move upwardly about the swing arm mount, further causing the rear wheel 804 to move upwardly. The orientation of the deflection surface 420 provides a smooth transition from the skid plate 800 to the rear wheel 804 of the motorcycle, such that when the rear wheel 804 contacts the mound of dirt 802, the rear wheel 804 will more easily overcome the mound of dirt 802. Furthermore, the orientation of the deflection surface 420, 650 of the linkage protector allows the linkage 120 not to contact the obstacle, and thus, provides a smooth transition over the obstacle.

In contrast, if the standard linkage arm discussed above in FIG. 1 encountered the same obstacle, the exposed rear shock linkage 120 would contact the obstacle. If the exposed rear shock linkage 120 contacted the obstacle several scenarios might play out. First, the exposed rear shock linkage 120 may impact and stick in the obstacle causing the motorcycle to suddenly stop, thereby causing the rider to be thrown from the motorcycle. Second, the exposed rear shock linkage 120 may impact and stick in the obstacle causing the motorcycle to suddenly stop, and could cause the rider valuable time in the race in which the rider is participating. Third, the exposed rear shock linkage 120 may impact the obstacle thereby damaging the rear shock linkage 120 and rendering the motorcycle inoperable.

The linkage protector may be suitably adapted to withstand elevated or low temperatures. The linkage protector may also be adapted to be exposed to environmental elements and environmental conditions such as water, sunlight, and cold temperatures without becoming structurally and/or aesthetically compromised.

The linkage protector may comprise any suitable material such as aluminum, steel, chromoly, titanium, magnesium, composite, plastic, and the like. In one embodiment the linkage protector can be made from 6061-T6 aluminum. In some embodiments the linkage protector can be made from 7075 and 2024 aluminum. The linkage protector may further comprise any suitable surface finish or treatment. For example, in one embodiment, at least a portion of the linkage protector may be formed of a surface hardened Aluminum. In one embodiment, the entire linkage protector may be formed of a surface hardened Aluminum. Additionally, in one embodiment the linkage protector may have a surface hardened type of a HARD ANODIZE MIL-A-8625F TYPE III. In another embodiment the linkage protector may have a surface hardened type of a SULFURIC ANODIZE MIL-A-8625 F TYPE II. In another embodiment, the deflection surface 420 may have a plastic or composite protection layer (not shown) attached thereto. Attachment of the plastic or composite protection layer may be by any suitable method.

In various embodiments, the linkage protectors describe above can be an integral piece or multiple pieces joined together by any suitable method. In some embodiments, depending on the type of material, the linkage protector may be fabricated by milling, casting, forging, powdered metal, and the like. In one embodiment, the linkage protector may be fabricated on a CNC milling machine. More specifically, in one embodiment the linkage protector may be unitary made from 6061-T6 aluminum fabricated using a CNC milling machine. In other embodiments, the aluminum, titanium, magnesium or other suitable material linkage protector linkage protector may be fabricated using a CNC milling machine. In other embodiments, the aluminum, titanium, magnesium or other suitable material linkage protector linkage protector may be fabricated by casting, forging, powdered metal, and the like. In other embodiments, a chrolmoly, steel, or other suitable material linkage protector can be made from multiple pieces and coupled together by welding or any other suitable method.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A linkage protector for a motorcycle having a rear shock with an exposed lower rear suspension linkage, a frame mount, and a joint having a linkage mount and a rear shock mount, wherein the rear shock mount is coupled to the exposed rear suspension lower linkage, the linkage protector comprising:
   a linkage arm comprising:
      a front mount configured to be coupled to the frame mount; and
      a pair of arms depending from opposite ends of the front mount, wherein each arm comprises a rear mount coupled to the linkage mount at an end of the pair of arms opposite the front mounting portion;
   a shield element comprising an end portion connected directly to and depending downwardly and rearwardly from the front mount and configured to provide a clearance distance between the pair of arms and a lower portion of the shield element to protect the exposed lower rear suspension linkage; and
   a cover coupled to the shield element.

2. The linkage protector of claim 1, wherein the rear mount comprises an adjustable mounting portion.

3. The linkage protector of claim 2, wherein the adjustable mounting portion comprises an opening that receives an adjusting cam.

4. The linkage protector of claim 3, wherein the adjusting cam is removable and rotatable.

5. The linkage protector of claim 4, wherein the adjusting cam is rotatable to change a distance between a coupling point of the linkage arm to the frame mount and the rear mount of the arms to change a height of the rear shock.

6. The linkage protector of claim 1, further comprising a pair of rear support members extending between the lower portion of the shield element and the rear mount of each of the respective arms.

7. The linkage protector of claim 1, further comprising a partial sidewall connecting the linkage arm and the shield element.

8. The linkage protector of claim 1, wherein the lower portion of shield element is located at a horizontal distance from the arms and a width which define a deflection surface.

9. The linkage protector of claim 1, wherein the cover is coupled to the shield element and configured to provide a deflection surface.

10. A linkage protector for a motorcycle having a rear shock with an exposed lower rear suspension linkage, the linkage protector comprising:
    a linkage arm comprising:
       a front mount configured to be coupled to the motorcycle; and
       a pair of arms depending from opposite ends of the front mount, wherein each arm comprises a rear mount configured to be coupled to the motorcycle at an end of the pair of arms opposite the front mount;
    a shield element comprising an end portion connected directly to and depending downwardly and rearwardly from the front mount and configured to provide a clearance distance between the pair of arms and a lower portion of the shield element to protect the exposed lower rear suspension linkage;
    a pair of rear support members extending between the lower portion of the shield element and the rear mount of each of the respective arms; and
    a cover coupled to the linkage arm and configured to protect the shield element.

11. The linkage protector of claim 10, wherein the rear mount comprises an adjustable mounting portion.

12. The linkage protector of claim 11, wherein the adjustable mounting portion comprises an opening that receives an adjusting cam.

13. The linkage protector of claim 12, wherein the adjusting cam is removable and rotatable.

14. The linkage protector of claim 13, wherein the adjusting cam is rotatable to change a distance between a coupling point of the linkage arm to the motorcycle and the rear mounting portion of the arms to change a height of the rear shock.

15. The linkage protector of the claim 10, further comprising a partial sidewall connecting the linkage arm and the shield element.

16. The linkage protector of the claim 10, further comprising a full sidewall connecting the linkage arm and the shield element.

17. The linkage protector of 10, wherein the lower portion of the shield element is located at a horizontal distance from the arms and a width which define a deflection surface.

18. The linkage protector of claim 10, wherein the front mount further comprises a bore.

19. The linkage protector of claim 10, wherein the cover is coupled to the shield element and configured to provide a deflection surface.

20. A linkage protector for a motorcycle having a rear shock with an exposed lower rear suspension linkage, the linkage protector comprising:
    a front mount configured to be coupled to the motorcycle; and
    a pair of arms depending from opposite ends of the front mount, wherein each arm comprises a rear mount configured to be coupled to the motorcycle at an end of the pair of arms opposite the front mount;
    a shield element comprising an end portion connected directly to and depending downwardly and rearwardly from the front mount and configured to provide a clearance distance between the pair of arms and a lower portion of the shield element to protect the exposed lower rear suspension linkage; and
    a pair of rear support members extending between the lower portion of the shield element and the rear mount of each of the respective arms.

* * * * *